(12) United States Patent
Rusert et al.

(10) Patent No.: US 9,036,705 B2
(45) Date of Patent: May 19, 2015

(54) TECHNIQUE FOR BRINGING ENCODED DATA ITEMS INTO CONFORMITY WITH A SCALABLE CODING PROTOCOL

(75) Inventors: Thomas Rusert, Kista (SE); Jörg Huschke, Aachen (DE); Markus Kampmann, Aachen (DE); Thorsten Lohmar, Aachen (DE); Clinton Priddle, Indooroopilly (AU); Rickard Sjöberg, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 900 days.

(21) Appl. No.: 13/255,212

(22) PCT Filed: Mar. 13, 2009

(86) PCT No.: PCT/EP2009/001846
§ 371 (c)(1),
(2), (4) Date: Nov. 14, 2011

(87) PCT Pub. No.: WO2010/102650
PCT Pub. Date: Sep. 16, 2010

(65) Prior Publication Data
US 2012/0057635 A1 Mar. 8, 2012

(51) Int. Cl.
| H04B 1/66 | (2006.01) |
|---|---|
| H04N 7/36 | (2006.01) |
| H04N 21/845 | (2011.01) |
| H04N 21/2343 | (2011.01) |
| H04N 21/2381 | (2011.01) |
| H04N 21/6437 | (2011.01) |
| H04N 19/70 | (2014.01) |
| H04N 19/33 | (2014.01) |
| H04N 19/40 | (2014.01) |

(52) U.S. Cl.
CPC ... *H04N 21/8451* (2013.01); *H04N 21/234309* (2013.01); *H04N 21/234327* (2013.01); *H04N 21/2381* (2013.01); *H04N 21/6437* (2013.01); *H04N 19/70* (2014.11); *H04N 19/33* (2014.11); *H04N 19/40* (2014.11)

(58) Field of Classification Search
CPC combination set(s) only.
See application file for complete search history.

(56) References Cited

U.S. PATENT DOCUMENTS

| 6,529,604 B1* | 3/2003 | Park et al. | 381/22 |
| 7,733,956 B1* | 6/2010 | Kalra et al. | 375/240.1 |
| 2006/0098944 A1* | 5/2006 | Kobayashi et al. | 386/95 |
| 2006/0110135 A1* | 5/2006 | Kawabata et al. | 386/95 |
| 2006/0182418 A1* | 8/2006 | Yamagata et al. | 386/95 |

(Continued)

OTHER PUBLICATIONS

De Cock, J. et al. "Advanced Bitstream Rewriting from H.264/AVC to SVC." 15th IEEE International Conference on Image Processing, San Diego, CA, USA, Oct. 12-15, 2008.

(Continued)

*Primary Examiner* — Christopher S Kelley
*Assistant Examiner* — Asmamaw G Tarko
(74) *Attorney, Agent, or Firm* — Coats & Bennett, PLLC

(57) ABSTRACT

A technique for making media content in the form of encoded data items decodable by a decoder operating in accordance with a scalable coding protocol that defines two or more media layers is provided. A method implementation of this technique comprises the steps of generating one or more dummy data items that define a first media layer of the scalable coding protocol, and marking the encoded data items as belonging, to a second media layer of the scalable coding protocol.

14 Claims, 3 Drawing Sheets

(56) References Cited

U.S. PATENT DOCUMENTS

| | | | |
|---|---|---|---|
| 2007/0031122 A1* | 2/2007 | Yamagata et al. | 386/95 |
| 2007/0200923 A1* | 8/2007 | Eleftheriadis et al. | 348/14.08 |
| 2007/0230568 A1* | 10/2007 | Eleftheriadis et al. | 375/240.1 |
| 2012/0069131 A1* | 3/2012 | Abelow | 348/14.01 |
| 2013/0173402 A1* | 7/2013 | Young et al. | 705/14.73 |
| 2013/0191550 A1* | 7/2013 | Hannuksela | 709/231 |

OTHER PUBLICATIONS

Schwarz, H. et al. "Overview of the Scalable Video Coding Extension of the H264/AVC Standard." IEEE Transactions on Circuits and Systems for Video Technology, vol. 17, No. 9, Sep. 2007.

* cited by examiner

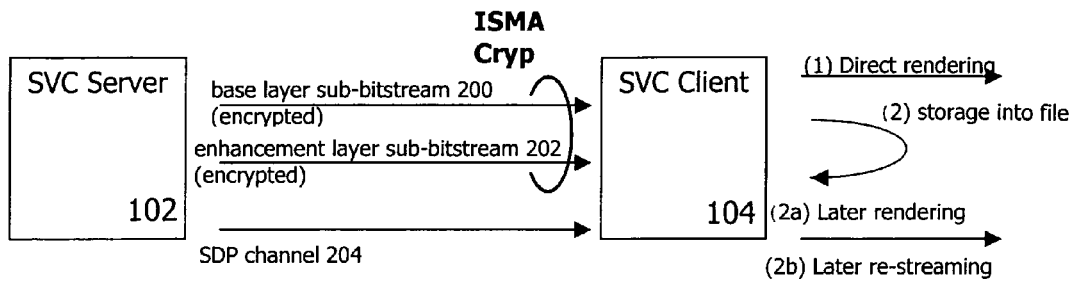
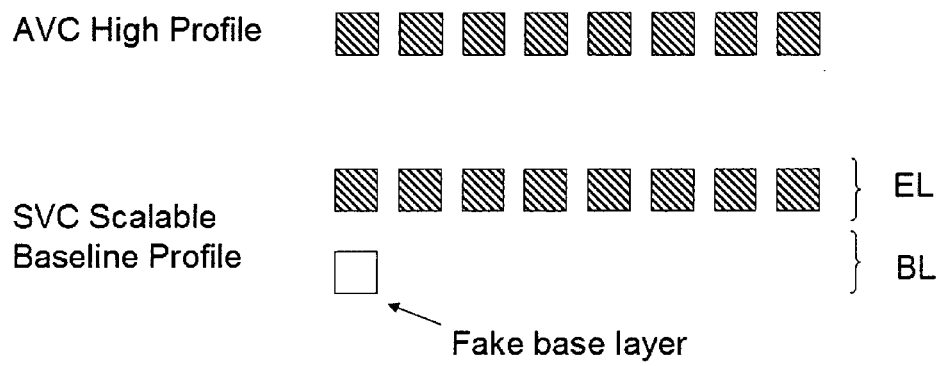
Fig. 3
Fig. 4
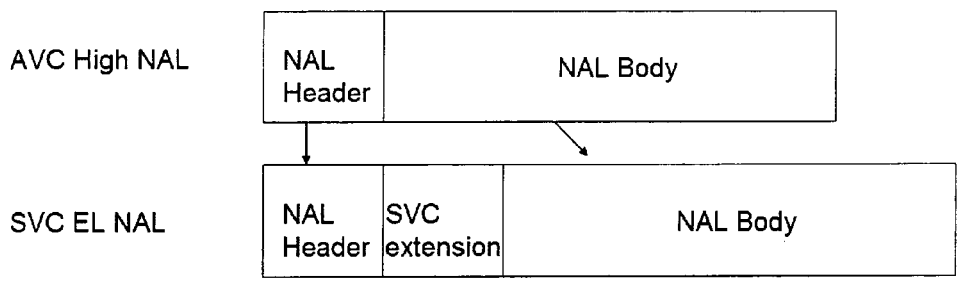
Fig. 5

TECHNIQUE FOR BRINGING ENCODED DATA ITEMS INTO CONFORMITY WITH A SCALABLE CODING PROTOCOL

TECHNICAL FIELD

The present disclosure generally relates to a technique for handling media content such as video, audio or multimedia content. In particular, the disclosure is directed to making media content in the form of encoded data items decodable by a decoder operating in accordance with a scalable coding protocol.

BACKGROUND

Modern media content distribution systems such as mobile video transmission systems are becoming increasingly popular. Bitstream scalability is a desirable feature in such media content distribution systems. An encoded media bitstream is generally called scalable when parts of the bitstream can be removed so that the resulting sub-bitstream can still be decoded by a target decoder. The media content of the sub-bitstream can be reconstructed at a quality that is less than that of the original bitstream, but still high when considering the resulting reduction of transmission and storage resources. Bitstreams that do not have these properties are also referred to as single-layer bitstreams.

Scalable Video Coding (SVC) is one solution to the scalability needs posed by the characteristics of video transmission systems. The SVC standard as specified in Annex G of the H.264/Advanced Video Coding (AVC) specification allows the construction of bitstreams that contain scaling sub-bitstreams conforming to H.264/AVC. H.264/AVC is a video compression standard equivalent to the Moving Pictures Expert Group (MPEG)-4 AVC (MPEG-4 AVC) standard.

The SVC standard encompasses different scalability concepts as described, for example, in Schwarz et al., "Overview of the Scalable Video Coding Extension of the H.264/AVC standard", IEEE Transactions on Circuits and Systems for Video Technology", Vol. 17, No. 9, September 2007. For spatial and quality bitstream scalability, i.e. the generation of a sub-bitstream with lower spatial resolution or quality than the original bitstream, Network Abstraction Layer (NAL) units are removed from the bitstream when deriving the sub-bitstream. In this case, inter-layer prediction, i.e., the prediction of the higher spatial resolution or quality bitstream based on information contained in the lower spatial resolution or quality bitstream, is used for efficient encoding. For temporal bitstream scalability, i.e., the generation of a sub-bitstream with a lower temporal sampling rate than the original bitstream, complete access units are removed from the bitstream when deriving the sub-bitstream. An access unit is defined as a set of consecutive NAL units with specific properties. In the case of temporal bitstream scalability, high-level syntax and inter prediction reference pictures in the bitstream are constructed accordingly.

In the SVC standard, the sub-bitstream having a lower temporal sampling rate, lower spatial resolution or lower quality is referred to as Base Layer (BL) sub-bitstream, while the higher temporal sampling rate, higher spatial resolution or higher quality sub-bitstream is referred to as Enhancement Layer (EL) sub-bitstream. It should be noted that in scenarios with multiple sub-bitstreams of, for example, different higher spatial resolution, two or more EL sub-bitstreams may be provided in total.

Each image of an SVC video image sequence is represented as so-called "frame" (i.e., as an encoded representation of this image). Each SVC sub-bitstream comprises a sequence of so called SVC "sub-frames". Each SVC sub-frame constitutes either a full SVC frame or a fraction of a SVC frame. In other words, each SVC frame is either represented as a single data item (i.e., one BL "sub-frame" or one EL "sub-frame") or is sub-divided in at least two separate data items, i.e., in one BL "sub-frame" containing only the BL information associated with the respective frame and (at least) one EL "sub-frame" containing the EL information associated with the respective frame. In the SVC bitstream an EL sub-frame may temporally correspond to a certain BL sub-frame.

The scalability feature introduced by the SVC standard allows for a bitstream adaptation dependent on, for example, decoder capabilities, display resolutions and available transmission bit rates. If only the BL sub-frames are decoded, the video content can be rendered for example at a basis resolution or quality (e.g., at Quarter Video Graphics Array, or QVGA, resolution). If, on the other hand, both the BL and the EL sub-frames are decoded, then the video content can be rendered at a higher resolution or quality (e.g., at VGA resolution).

The AVC specification as well as its SVC extension define so-called profiles. Each profile defines a set of coding tools (e.g., specific algorithms such as arithmetic or run length entropy coding) that are to be used for encoding and decoding the video content. As a result, the profiles implicitly define the complexity that is required to decode a (sub-)bitstream. The SVC extension of the AVC specification defines SVC specific profiles in addition to the conventional AVC profiles. One example of an SVC specific profile is the so-called Scalable Baseline Profile, which is targeted at mobile TV applications.

According to the SVC standard, an SVC BL sub-bitstream must be AVC compliant (i.e., must be decodable by an AVC compliant decoder). It should be noted that SVC EL sub-bitstreams are not required to be AVC compliant. As a result of the AVC compliance of an SVC BL sub-bitstream, an AVC Baseline Profile decoder will be able to decode the BL of a Scalable Baseline Profile bitstream.

It is likely to happen that future devices with media rendering capabilities will support SVC specific profiles (such as the Scalable Baseline Profile), but will not provide explicit support for any AVC profile. Such devices will be able to decode AVC bitstreams that comply with the SVC BL definition (such as bitstreams in accordance with the so-called Constrained Baseline Profile, which is a restricted version of the AVC Baseline Profile). However, the devices will not be able to decode AVC bitstreams that have been encoded according to more sophisticated AVC specific profiles, such as the AVC High Profile. The AVC High Profile is used today in Internet Protocol (IP) TV-like applications and may soon be used in high quality mobile TV applications.

In future there may exist a large amount of pre-encoded media content complying with the AVC High Profile. This pre-encoded video content will thus have to be transcoded before being consumable by devices only supporting SVC specific profiles such as the Scalable Baseline Profile. In other words, the pre-encoded AVC High Profile compliant video content will first have to be decoded and than re-encoded in accordance with either the AVC Constrained Baseline Profile or an SVC specific profile such as the Scalable Baseline Profile. Obviously, this transcoding operation consumes considerable computational resources and may additionally lead to a quality degradation.

SUMMARY

Accordingly, a more efficient technique is needed for bringing encoded data items into conformity with a scaling coding protocol.

According to a first aspect, a method of making media content in the form of encoded data items decodable by a decoder operating in accordance with a scalable coding protocol defining two or more media layers is provided. The method comprises generating one or more dummy data items that define a first media layer of the scalable coding protocol, and marking the encoded data items as belonging to a second media layer of the scalable coding protocol. As understood herein, media content includes various content types, including video content, audio content, multimedia content, and so on.

The method may also comprise the step of generating at least one bitstream comprising the dummy data items and the marked encoded data items. The bitstream may be stored in a file and/or distributed to one or more content recipients using a unicast, multicast or broadcast connection. Moreover, the bitstream may be delivered via one or more media streams. The one or more media streams may be transmitted by establishing, for example, for each media stream a separate Real Time Transport Protocol (RTP) session (or any other session) with the recipient of the media content. In one implementation, a first media stream corresponding to a first (sub-)bitstream comprises the dummy data items and a second media stream corresponding to a second (sub-)bitstream comprises the marked encoded data items. The latter data items (and, optionally, the dummy data items) may be transmitted to the recipient of the media content in a non-encrypted or in an encrypted form.

In addition to the encoded data items, control items may be provided that are intended to be transmitted together with at least one of the dummy data items and the encoded data items. If the control items do not (yet) conform to the scalable encoding protocol, the control items may be manipulated such that the manipulated control items conform to the scalable coding protocol. According to another variant, the control items are newly created in accordance with the scalable coding protocol for at least one of the dummy data items and the marked encoded data items. The at least one bitstream with the dummy data items and the marked encoded data items may additionally comprise the manipulated or newly created control items.

The marking of the encoded data items may be performed in various ways. For example, the encoded data items may be associated with an indicator of the second media layer. According to one variant, the indicator can take the form of a labeling item intended to be transmitted with each encoded data item (e.g., as a prefix or suffix of the encoded data item). The labeling item marks the encoded data item as belonging to the same media layer. The encoded data item and the associated labeling item may be configured to be transmitted as separate entities.

According to another variant, each encoded data item is associated with a header, and the indicator is a header parameter marking the encoded data item as belonging to the second media layer. In such a scenario, the indicator may be included in a new header field appended to an existing header. As an alternative, or additionally, the indicator may be set by overwriting a header parameter in an existing header field with a new header parameter that marks the encoded data item as belonging to the second media layer.

In one implementation, the dummy data items are void of any media content (i.e., do not carry any media payload). The dummy data items may, for example, be associated with the conventional headers as prescribed in the scalable coding protocol but may carry no further meaningful media content.

The encoded data items may have been generated by different types of predictive encoding, such as intra-picture predictive encoding ("I"), inter-picture predictive encoding ("P") and/or bi-predictive encoding ("B"). In this implementation, any encoded data items that have been generated by a predictive encoding type not supported by the scalable coding protocol (e.g., not supported by a specific protocol profile) may be manipulated to be compliant with the scalable coding protocol.

According to one variant, the individual media layers are hierarchically structured in the sense of one base layer and one or more enhancement layers (e.g., the decoded data items of a particular enhancement layer may nominally only be rendered in combination with the base layer data items and the data items of zero, one or more enhancement layers of an intermediate hierarchy level). In the present scenario the first media layer with the dummy data items may be the base layer and the second media layer with the marked encoded data items may be an enhancement layer (or vice versa). In the case of multiple enhancement layers, the enhancement layers may among themselves also have a hierarchy. In another variant, the individual media layers have no hierarchical but a flat structure. A flat layer structure can, for example, be realized by so-called Multiple Description Coding (MDC). In an MDC scenario, the layers are nominally mutually refining but can be decoded and rendered either singly (e.g., with a lower quality or resolution) or jointly (e.g., with an enhanced quality or resolution).

The encoded data items may have been encoded in accordance with a single-layer coding protocol such as H.264/AVC. The scalable coding protocol may be the SVC extension to H.264/AVC. According to a further variant, the encoded data items have been encoded in accordance with a first scalable coding protocol, and the dummy data items and markings are generated in accordance with a second scalable coding protocol.

The generating and marking steps discussed herein may be performed at different stages of the media encoding and rendering process. For example, the method may be applied in context with the encoded data items being stored in a file. According to a first option, the encoded data items are read from the file, the generating and marking steps are performed, and the resulting dummy data items and marked encoded data items are written back into the file or are directly converted into a bitstream for transmission. According to a second option, the marking is performed while the encoded data items remain stored in the file, and the generated dummy data items are also written in the file.

The technique discussed herein may also be applied to a bitstream comprising the encoded data items (e.g., in the context of a streaming session). In this regard, the technique may further comprise receiving an input bitstream comprising the encoded data items, recovering the encoded data items from the input bitstream and marking the recovered encoded data items, and generating an output bitstream comprising the generated dummy data items and the marked encoded data items.

If the input bitstream belongs to a streaming session, the technique may further comprise converting session parameters (e.g., according to the Session Description Protocol, or SDP) associated with the streaming session in accordance with the scalable coding protocol. The session parameters may be transmitted in-band (i.e., within the input bitstream and/or output bitstream) or out-of-band (e.g., via a dedicated communication channel).

If the input bitstream and the output bitstream comprises packets such as RTP packets, the technique may also comprise de-packetizing the packets of the input bitstream to recover the encoded data items. In a next step, at least the marking and generating steps are performed, before the resulting dummy data items and marked encoded data items are packetized into RTP or other packets for the output bitstream.

According to another aspect, a computer program product is provided. The computer program product comprises program code portions for performing one or more of the steps of one or more of the method aspects described herein when the computer program product is executed on one or more computing devices. The computer program product may be stored on a computer-readable recording medium such as a permanent or re-writeable memory, a CD-ROM, or a DVD. The computer program product may also be provided for download via one or more computer networks, such as the Internet, a cellular telecommunications network or a wireless or wired Local Area Network (LAN).

According to a further aspect, a converting device is provided for making media content in the form of encoded data items decodable by a decoder operating in accordance with a scalable coding protocol defining two or more media layers. The converting device comprises a generator configured to generate one or more dummy data items that define a first media layer of the scalable coding protocol, and am adaptor configured to mark the encoded data items as belonging to a second media layer of the scalable coding protocol. The converting device may further comprise an input interface configured to receive the encoded data items as well as an output interface configured to output the generated dummy data items and the marked encoded data items.

According to a still further aspect, a converting system comprising the converting device is provided. The converting system may additionally comprise a data storage storing the encoded data items and coupled to the input interface of the converting device. Additionally, a bitstream maker may be provided that is coupled to the output interface of the converting device and configured to generate at least one bitstream comprising the generated dummy data items and the marked encoded data items.

BRIEF DESCRIPTION OF THE DRAWINGS

In the following, the present technique will be described in more detail with reference to exemplary embodiments illustrated in the drawings, wherein FIG. 1 schematically illustrates an embodiment of a converting system comprising a media server embodiment and a media client;

FIG. 3 is a schematic diagram illustrating a transmission of encrypted media content via dedicated media streams from a media server to a media client in an SVC embodiment;

FIG. 4 is a schematic diagram illustrating an AVC single-layer and an SVC two-layer media content embodiment; and FIG. 5 schematically illustrates an embodiment of a header manipulation operation.

DETAILED DESCRIPTION

In the following description, for purposes of explanation and not limitation, specific details are set forth, such as specific device configurations and specific media content handling, storage and streaming scenarios in order to provide a thorough understanding of the technique disclosed herein. It will be apparent to one skilled in the art that the technique may be practiced in other embodiments that depart from these specific details. Moreover, while the following embodiments will primarily be described in relation to the single-layer coding protocol AVC and its SVC extension, it will be readily apparent that the techniques described herein may also be practiced in context with other encoding protocols. Furthermore, while in the following reference will be made to MPEG 4 compatible file formats and RTP-based sessions, the techniques discussed herein can also be implemented using other file formats and transport protocols.

Those skilled in the art will further appreciate that the methods, steps and functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments are primarily described in the form of methods and devices, the technique disclosed herein may also be embodied in a computer processor and a memory coupled to the processor, wherein the memory stores one or more programs that perform the steps discussed herein when executed by the processor.

Figure 1:
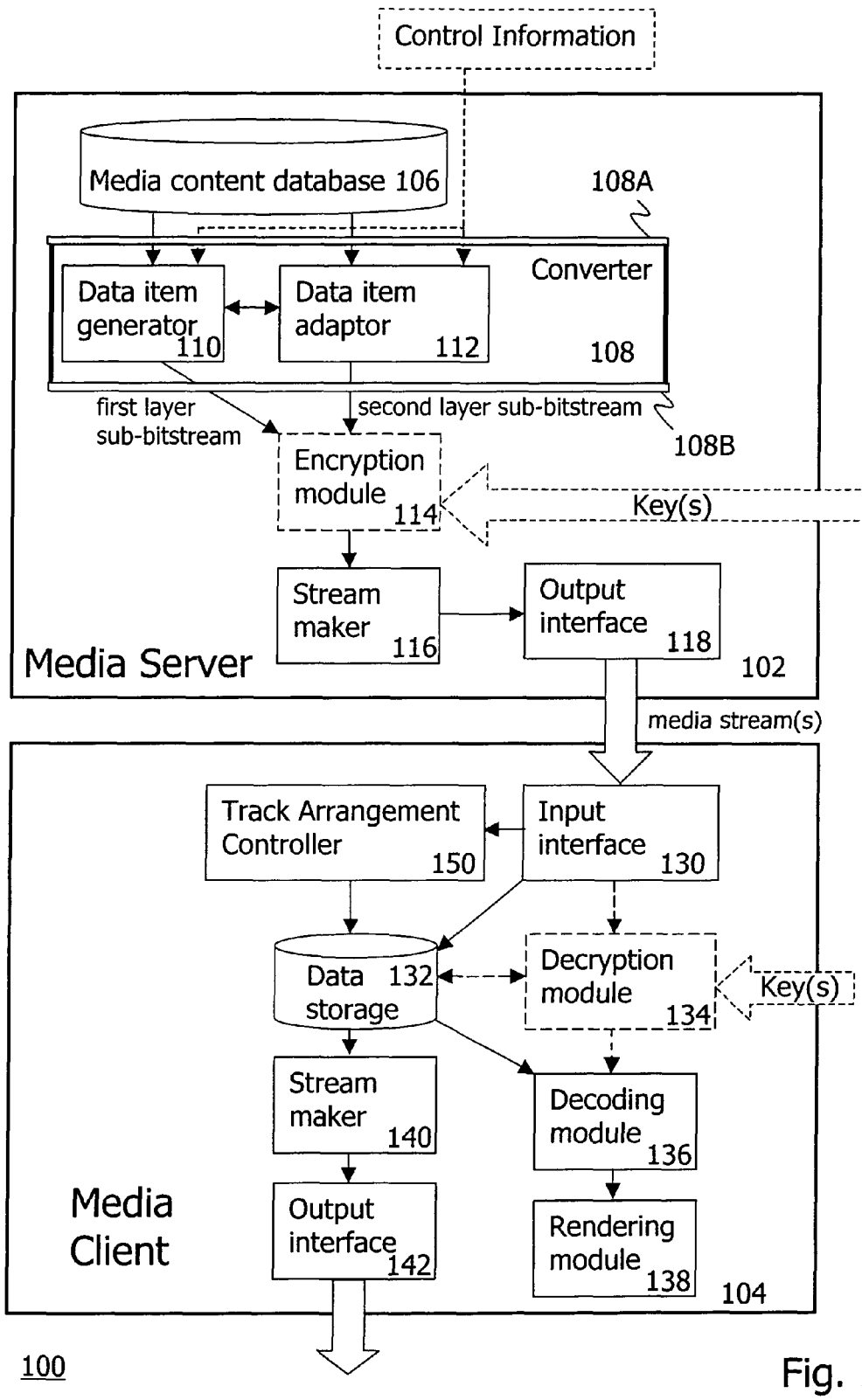

Reference is now made to FIG. 1, which shows an exemplary media content distribution system 100 with conversion capabilities. The system 100 comprising a media server 102 as well as a media client 104 receiving media content from the media server 102. While the system 100 of FIG. 1 illustrates only a single media client 104, it will be appreciated that the media server 102 will in practice be configured to distribute media content to a plurality of media clients 104 simultaneously. Also, each media client 104 may be configured to receive media content from more than one media server 102.

The media server 102 comprises a media content database 106 for storing media content files comprising pre-encoded data items. In the present embodiment, the media content files are video files compliant with a mobile television standard. It will be appreciated that in alternative embodiments, the encoded media content files stored in the database 106 could also be audio files or multimedia files. Optionally, the media server 102 further comprises an input interface (not shown) for receiving media content files. The received media content files may then be stored in the database 106 and retrieved at a later point in time. Alternatively, the received media content files may only be temporarily buffered in the database 106 or may even as a bitstream bypass the database 106, e.g. for live content delivery.

The media server 102 further comprises a converter 108 adapted to make the encoded data items stored in the media content files of the database 106 (or included in the bitstream received via the optional input interface) decodable by a decoder of the media client 104. It will be assumed here that the data items have been encoded using a (single-layer or scalable) coding protocol not compatible with the scalable coding protocol supported by the media client 104. The operation of the converter 108 is controlled by control information (including information on the number and dependency of layers the converted media content will have), which is provided to the media server 102 from an external controller as shown in FIG. 1. Alternatively, the control information can be generated by an in internal controller (not shown) of the media server 102.

The converter 108 of the media server 102 comprises an input interface 108A coupled to the media content database 106 as well as an output interface 108B. The converter 108 further includes a data item generator 110 and a data item adaptor 112. The data item generator 110 is configured to generate one or more dummy data items that are to define a first media layer of the scalable coding protocol. The data item adaptor 112, on the other hand, is configured to at least mark encoded data items that have been read from a media file in the media content database 106. In more detail, the adaptor 112 marks the encoded data items as belonging to a second media layer of the scalable coding protocol.

Figure 2:
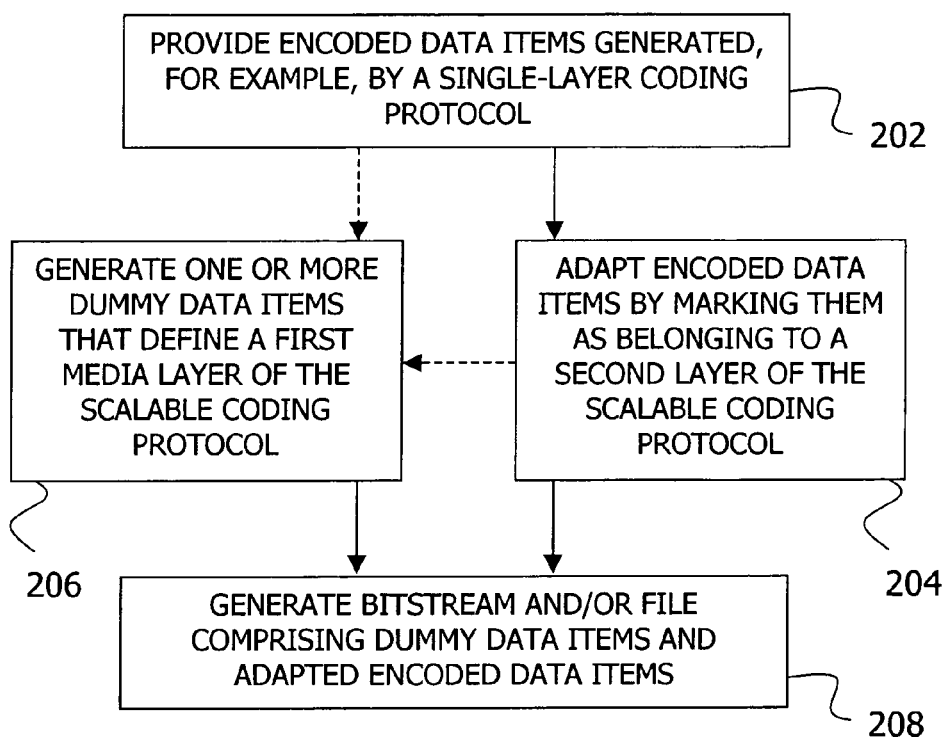
FIG. 2 is a schematic flow chart illustrating a method embodiment of a conversion operation.

The operation of the converter 108 is briefly illustrated in the exemplary flow diagram 200 of FIG. 2. In a first step 202, the media content database 106 or another source provides the encoded data items. In a next step 204, the adaptor 112 marks the encoded data items read from the database 106 as belonging to the second layer of the scalable coding protocol. Concurrently with the marking operation in step 204, the generator 110 generates in step 206 one or more dummy data items that define the first media layer of the scalable coding protocol. The generation step 206 may be performed taking into account information about the encoded data items received from the database 106 or information obtained or generated in step 204. Such information may, for example, relate to the size of the media content file to be converted (e.g., in order to ensure that the generated dummy data items do not lead to a violation of any size-related constraints). In a further step 208, at least one bitstream (and/or file) comprising the dummy data items as well as the marked encoded data items is generated as will be described in more detail below.

Turning again to FIG. 1, each of the generator 110 and the adaptor 112 generates a dedicated sub-bitstream corresponding to a dedicated media layer of the scalable coding protocol. Each sub-bitstream comprises a continuous sequence of individual data items (e.g., subframes). The sub-bitstream of dummy data items output by the generator 110 as well as the sub-bitstream of marked encoded data items output by the adaptor 112 are transferred via the output interface 108B of the converter 108 to an optional encryption module 114. The encryption module 114 is configured to encrypt at least the marked encoded data items and, optionally, also the dummy layer data items using the same or different encryption keys. The keys may be stored locally or may be obtained from an external key source (as indicated in FIG. 1).

The encryption module 114 is coupled to a stream maker 116. The stream maker is configured to process the individual (and optionally encrypted) sub-bitstreams from the data item generator 110 and the data item adaptor 112 dependent on the transmission configurations. In one transmission configuration, the two sub-bitstreams are combined to a single bitstream for being transmitted via a single media stream to the media client 104. In another transmission configuration, the two sub-bitstreams are delivered via individual media streams. As understood herein, a media stream comprises a bitstream or sub-bitstream for which an individual (e.g., RTP-based) session has been initiated between the media server 102 and the media client 104.

The bitstream or sub-bitstreams output by the stream maker 116 are fed to an output interface 118 of the media server 102. The output interface 118 is configured to establish a media session with the media client 104 via a unicast, multicast or broadcast connection. In a unicast scenario, the media server 102 will have a dedicated communication link with each media client as exemplarily shown for one media client 104 in FIG. 1. In a multicast or broadcast scenario, one or more additional media clients 104 will be coupled to the same media stream. The output interface 118 is also configured to transmit the media stream(s) together with session parameters (such as Session Description Protocol, or SDP, parameters) to the media client 104. Each media stream output by the output interface 118 to the one or more media clients 104 may be a separate RTP stream. The output interface 118 further adds headers to the media stream such as Internet Protocol (IP) headers, User Datagram Protocol (UDP) headers or RTP headers for the transmission to the media client 104.

Turning now to the media client 104 of FIG. 1, the one or more media streams distributed by the media server 102 are received together with the session parameters at an input interface 130. The input interface 130 removes the IP headers, UDP headers and RTP headers solely used for transmission purposes.

The input interface 130 is coupled to a data storage 132. The data storage 132 is configured to store the (optionally decrypted) dummy data items and marked encoded data items in an appropriate media file format such as MPEG-4. The media client 104 further comprises an optional decryption module 134 adapted to decrypt any encrypted data items before their storage in the data storage 132. The decryption module 134 has access to one or more decryption keys that are either stored locally or obtained from an external key source as indicated in FIG. 1. Generally speaking, the decryption module 134 performs the opposite operations of the encryption module 114 applying either a single decryption key or two or more different decryption keys depending on the specific encryption modalities. Unencrypted data items may bypass the decryption module 134.

In the data storage 132 the data items are stored in a media file such that the various data items will nominally (i.e., neglecting the contentless character of the dummy data items) be accessible via one or more media tracks of the media file. A track arrangement controller 150 is configured to control the arrangement of media tracks in the media file. For example, it controls the storage of the dummy data items such that they are accessible via a first media track of the media file. The marked encoded data items are stored to be accessible via a second media track of the media file. Additionally, track reference indices are generated by the track arrangement controller 150 upon receipt of the data items and before creating the media file. It should be noted that in an alternative single track embodiment the dummy data items and the adapted encoded data items could also be stored in one and the same media track.

In the present embodiment only reading of the second media track with the marked encoded data items is enabled (as the contentless dummy data items referenced in the first media track cannot be rendered in a meaningful manner). Upon reading the second media track, the track reference indices associated with individual second layer data items may optionally also be evaluated to identify and read the media track in which the first layer data items required for a nominally enhanced rendering of the media content are accessible.

The data items read from the media file in the data storage 132 (or taken directly from the input interface 140 or decryption module 134) are passed to a decoding module 136. The decoding module 136 is adapted to decode the data items in a sequence controlled by a selected media track. The decoded data items are then passed in their correct sequence from the decoding module 136 to a rendering module 138 for being rendered to be output by at least one output unit (not shown).

The output unit (e.g., a display and/or a loudspeaker) may be part of the media client 104 or connectable to the media client 104.

The media client 104 may also be configured to fulfil itself the function of a media server. To this end, the media client 104 comprises a stream maker 140 coupled to the data storage 132. The stream maker 140 is configured to generate at least one bitstream comprising the dummy data items and the marked encoded layer data items. In one configuration, the stream maker 140 generates a first (sub-)bitstream comprising the dummy data items and a second (sub-)bitstream comprising the marked encoded data items as read from the data storage 132. The resulting media stream(s) may then be output via an output interface 142 of the media client 104 to a further media client (not shown).

Several details and further advantages of the technique presented herein will now be described in the context of an exemplary SVC scenario in which media content protection is realized using, for example, the ISMACryp 1.0 or 2.0 protocol. According to the ISMACryp specifications, each of the SVC layers is separately content protected by a dedicated encryption key and transmitted in a separate RTP media stream as schematically illustrated in FIG. 3.

FIG. 3 shows the media content distribution from an SVC server 102 to an SVC client 104. The internal configurations of the SVC server 102 and SVC client 104 are not shown in FIG. 3 but may generally correspond to the configurations of the media server 102 and the media client 104, respectively, of FIG. 1.

As illustrated in FIG. 3, two dedicated RTP media streams 200, 202 stretch from the output interface 118 of the SVC server 102 to the input interface 130 of the SVC client 104. A first media stream 200 contains the BL sub-frames (i.e., the dummy data items) encrypted with a first encryption key, while the second media stream 202 comprises the EL sub-frames (i.e., the marked encoded data items). The EL sub-frames have been encrypted with a second encryption key different from the first encryption key. The encryption is thus performed in an ISMACryp compliant way. In an alternative embodiment, the first encryption key and the second encryption key could be identical and only a single media stream comprising both the dummy data items and the marked encoded data items could be used.

As can be gathered from FIG. 3, there additionally extends a session control channel 204 between the SVC server 102 and the SVC client 104. The channel 204 is used to signal SDP compliant session parameters out-of-band to the SVC client 104. It should be noted that instead of using the session control channel 204, the session parameters could also be transmitted in-band via one or both of the media streams 200, 202.

Upon receipt of the two media streams 200, 202, there exist two major use-cases for handling the media content by the SVC client 104. As illustrated in FIG. 3, the first use-case pertains to a direct rendering of the media content, and the second use-case is the storage of the media content for later rendering or later re-streaming. Both use-cases have already been briefly discussed in context with the rendering module 138 and the stream maker 140 of the media client 104 shown in FIG. 1.

In the following, the conversion operation performed by the SVC servers 102 of FIGS. 1 and 3 for the exemplary context of converting a single-layer AVC High Profile encoded video into a multi-layer SVC Scalable Baseline Profile coded video will be explained in more detail. As will become apparent, this conversion operation does not require any explicit decoding and re-encoding. Rather, the conversion approach is based on the fact that essential coding tools defined in the AVC High Profile are also supported in the EL processing chain of an SVC Scalable Baseline Profile decoder. Specifically, the AVC High Profile bitstream is converted such that it will be identified as a multi-layer SVC bitstream by the SVC decoder 136 of the SVC client 104.

It is assumed here that the encoded media file is received by the data item adaptor 112 of the media server 102 in the form of a sequence of NAL units according to the AVC specification and compliant with the AVC High Profile (as shown in the upper portion of FIG. 4). The data item adaptor 112 and the data item generator 110 then co-operate to produce an EL sub-bitstream as well as a BL sub-bitstream as shown in the lower portion of FIG. 4.

The data item generator 110 creates one or more dummy NAL units to define the SVC Scalable Baseline Profile BL. The resulting SVC compliant dummy BL NAL units will each have the prescribed SVC NAL header, but the NAL body will be void. As a result, a "fake" BL is generated as illustrated in the lower portion FIG. 4.

In the exemplary case of spatial scalability, at least one dummy BL NAL unit will thus be created with the prescribed SVC NAL header comprising a dependency identifier D set to 0 (thus indicating that the particular dummy BL NAL unit belongs to the BL). Depending on the use case, the priority identifier, the quality identifier and the temporal layer identifier in the header of the particular dummy BL NAL unit may also all be set to 0.

Optionally, the data item generator 110 additionally creates at least one of a BL Sequence Parameters Set (SPS) and a Picture Parameter Set (PPS) as (e.g., dummy) control item. An SPS contains sequence-specific information relating, for example, to a video profile and level and to a video dimension (i.e., number of macroblocks). A PPS contains picture-specific information relating, for example, to a quantization parameter and an entropy coding mode. The resulting BL SPS and BL PPS can be transmitted in the same bitstream as the dummy NAL units created for the BL.

During an ongoing media session, dummy BL NAL units may be transmitted repeatedly to keep the session from stopping. In such an implementation, one dummy BL NAL unit may be representative of an intra-picture predictive coding frame ("I frame"), and the remaining dummy BL NAL units could be representative of inter-picture predictive encoding frames ("P frames").

Having thus described the operation of the data item generator 110 with respect to the creation of a "fake" base layer, the operation of the data item adaptor 112 in context with adapting AVC NAL units to be compliant with an SVC EL layer will be explained.

As shown in FIG. 5, each AVC NAL unit comprises a header portion as well as a body portion. The data item adaptor 112 re-writes the AVC NAL unit headers such that the resulting NAL units will be interpreted as EL NAL units by the decoding module 136 of the media client 104. To this end, an SVC extension field is added to the AVC specific NAL unit header as illustrated in the lower portion of FIG. 5. The SVC extension field comprises the SVC specific header parameters indicative of an enhancement layer. This means in the exemplary case of spatial scalability, that the dependency identifier D in the newly added header field will be set to 1 (thus indicating that the particular SVC EL NAL unit belongs to the first enhancement layer). In certain scenarios, the dependency identifier D could also be set to a value >1. In addition to appending the SVC extension field to the AVC specific NAL unit header, the NAL unit type field in the existing header is overwritten to set the NAL unit type to 20 (to indicate that the NAL unit is an SVC EL NAL unit).

In some cases also the body portion of the AVC NAL unit as shown in FIG. 5 requires an adaptation. For example, AVC High Profile I, P, or B frames in the body portion may need to be rewritten into EI, EP, or EB frames, respectively. During this rewriting process, reference information regarding the "fake" base layer may be added to the I, P, or B frames. This reference information may control the decoding module 136 (see FIG. 1) such that no BL data items will be considered during the decoding process.

The SVC extension field carrying the dependency identifier D could alternatively by carried in a separate prefix NAL unit (NAL unit type 14). Accordingly, there exists an alternative to appending the SVC extension field to the AVC specific NAL unit header as illustrated in FIG. 5. That is, each AVC NAL unit may remain essentially untouched but will be associated with a newly generated prefix NAL unit carrying the SVC extension field with the dependency identifier D>0. The prefix NAL unit thus acts as an indicator specifying that the following NAL unit belongs to an SVC EL. As H.264/AVC B frames are not supported in the SVC Scalable Baseline Profile, any B frames in the body portion of the AVC NAL unit are rewritten by the data item adaptor 112 into EB frames.

The data items read by the data item adaptor 112 from the encoded media file not only comprise (encoded) media data items, the so-called Video Coding Layer (VCL) NAL units, but also control items, the so-called non-VCL NAL units. The non-VCL NAL units comprise control parameters such as the AVC SPS and PPS. As the SPS and other parameters have been generated in accordance with the AVC High Profile, the data item adaptor 112 modifies the non-VCL NAL units such that the parameters included therein (e.g., the SPS) conform to the corresponding definitions associated with the EL in an SVC Scalable Baseline Profile bitstream. The sub-bitstream output by the data item adaptor 112 will thus comprise both the VCL NAL units with the re-written headers or associated prefix NAL units (and re-written bodies at least in case of AVC B slices) as well as the non-VCL NAL units with re-written parameters.

In the above embodiment it has been assumed that the media server 102 reads the AVC NAL units from the media content database 106, applies the conversion rules to generate two SVC Scalable Baseline Profile sub-bitstreams, and forwards them after an encryption step via individual media streams 200, 202 to the SVC client 104. In an alternative embodiment the encryption step could be omitted and the two sub-bitstreams could be combined to a single bitstream and transmitted via a single media stream to the SVC client 104.

Moreover, instead of reading the encoded AVC NAL units from the media content database 106, the converter 108 of the media server 102 could in an alternative embodiment receive the AVC NAL units during a media session via an RTP stream (e.g., from an AVC High Profile live encoder). In order to deliver this RTP stream to the media client 104 (that can only handle SVC specific profiles, i.e., that cannot handle the AVC High Profile), the following further steps in addition to the steps discussed in context with FIGS. 4 and 5 have to be performed. In a first step, AVC High Profile SDP parameters (that may have been received out-of-band in a similar manner as shown in FIG. 3) are converted by the converter 108 into Scalable Baseline Profile SDP parameters. Additionally, the RTP packets in the RTP streams are de-packetized into raw AVC NAL units. These raw NAL units are then converted as discussed above to generate SVC Scalable Baseline Profile NAL units for the EL and the BL. The resulting SVC NAL units are packetized into RTP packets, and the resulting RTP packets (together with the associated Scalable Baseline Profile SDP parameters) are forwarded to the SVC client 104.

In RTP streaming of AVC, SPS parameters and PPS parameters may be delivered out-of-band through SDP. In such a case, and if it is desired to continue sending these parameters out-of-band, the (Base64) encoded SPS and PPS parameters are first transformed into raw non-VCL NAL units. The resulting non-VCL NAL units are then converted as discussed above, additional parameter set NAL units are created as required, and the resulting parameter sets are then re-encoded into a new SDP file for being transmitted out-of-band.

As has become apparent from the above, the technique discussed herein allows to convert, for example, single-layer coded media content into a multi-layer or scalable form without requiring explicit decoding and re-encoding operations. As a result, the complexity and possible quality degradation associated with such transcoding can be avoided. Moreover, the data amount that will be added during the conversion process (such as the dummy data items) can be assumed to be neglectable, so that there will be essentially no increase in bit rate or storing requirements.

In the foregoing, principles, embodiments and various modes of implementing the techniques disclosed herein have exemplarily been described. However, the present invention should not be construed as being limited to the particular principles, embodiments and modes discussed above. Rather, it will be appreciated that variations and modifications may be made by a person skilled in the art without departing from the scope of the present invention as defined in the following claims.

The invention claimed is:

1. A method of converting data items of a media content all pre-encoded in accordance with the H.264/Advanced Video Coding (AVC) protocol into encoded data items decodable by a decoder operating in accordance with a Scalable Video Coding (SVC) baseline profile defining two or more media layers, wherein the pre-encoded data items are stored in a media file in form of pre-encoded Network Abstraction layer (NAL) units and are compliant with the single-layer AVC high profile, the method comprising:

reading the pre-encoded AVC NAL units from the media file;

generating one or more dummy data items in form of one or more dummy NAL units to define a SVC scalable baseline profile Base Layer (BL);

marking the read pre-encoded AVC NAL units as belonging to a SVC Enhancement Layer (EL) and manipulating the AVC NAL units being pre-coded by a predictive encoding type not supported by the SVC scalable baseline profile to be compliant with the SVC scalable baseline profile; and generating at least one bitstream comprising the marked encoded data items of the media content and the generated dummy data items.

2. The method of claim 1, further comprising:

providing control items intended to be transmitted together with at least one of the dummy data items and the encoded data items; and if required, manipulating control items generated in accordance with the AVC profile such that the manipulated control items conform to the definitions associated with the SVC scalable baseline profile.

3. The method according to claim 2, wherein the at least one bitstream also comprises the control items.

4. The method of claim 1, wherein marking the encoded data items further comprises associating the encoded data items with an indicator of the SVC enhancement layer.

5. The method of claim 4, wherein the indicator comprises a labelling item intended to be transmitted with each encoded data item, the labelling item marking the encoded data item as belonging to the SVC enhancement layer.

6. The method of claim 4, further comprising associating each encoded date item with an NAL unit header, and wherein the indicator comprises a header parameter marking the encoded data item as belonging to the SVC enhancement layer.

7. The method according to claim 6, wherein the header parameter comprises an SVC specific header parameter and is comprises in an SVC extension field added to the AVC NAL unit header.

8. The method of claim 1, wherein the dummy data items are void of any media content.

9. The method of claim 1, further comprising generating the encoded data items by different types of predictive encoding, wherein the predictive encoding comprises one of intra-picture predictive encoding ("I"), inter-picture predictive encoding ("P"), and bi-predictive encoding ("B").

10. The method of claim 1, further comprising writing the generated data items and the marked encoded data items into the file.

11. The method of claim 1, wherein the generating the one or more dummy data items and marking the encoded data items comprises concurrently generating the one or more dummy data items and marking the encoded data items.

12. A computer program product comprising non-transient program code stored on a computer readable medium for execution by one or more computing devices in a media server to cause said one or more computing devices to convert data items of a media content all pre-encoded in accordance with the H.264/Advanced Video Coding (AVC) protocol into encoded data items decodable by a decoder operating in accordance with a Scalable Video Coding (SVC) baseline profile defining two or more media layers, wherein the pre-encoded data items are stored in a media file in form of pre-encoded Network Abstraction Layer (NAL) units and are compliant with the single-layer AVC high profile, said program code comprising program instructions configured to cause said one or more computing devices to:
read the pre-encoded AVC NAL units from the media file;
generate one or more dummy data items in form of one or more dummy NAL units to define a SVC scalable baseline profile Base Layer (BL);
mark the read pre-encoded AVC NAL units as belonging to a SVC Enhancement Layer (EL) and manipulating the AVC NAL units being pre-coded by a predictive encoding type note supported by the SVC scalable baseline profile to be compliant with the SVC scalable baseline profile; and
generate at least one bitstream comprising the marked encoded data items of the media content and the generated dummy data items.

13. A converting device for converting data items of a media content all pre-encoded in accordance with the H.264/Advanced Video Coding (AVC) protocol into encoded data items decodable by a decoder operating in accordance with the Scalable Video Coding (SVC) scalable baseline profile defining two or more media layers, wherein the pre-encoded data items are stored in a media file in form of pre-encoded Network Abstraction Layer (NAL) units and being compliant with the single-layer AVC high profile, the device comprising:
a generator configured to generate one or more dummy data items in form of one or more NAL units to that define an SVC scalable baseline profile Base Layer (BL); and
an adaptor configured to read the pre-encoded AVC NAL units from the media file and to mark the read pre-encoded data items of the media content as belonging to an SVC Enhancement Layer (EL) and to manipulate the AVC NAL units being pre-encoded by a predictive encoding type not supported by the SVC scalable baseline profile to be compliant with the SVC scalable baseline profile.

14. A converting system comprising:
a converting device for converting data items of a media content all pre-encoded in accordance with the H.264/Advanced Video Coding (AVC) protocol into encoded data items decodable by a decoder operating in accordance with the Scalable Video Coding (SVC) scalable baseline profile defining two or more media layers, wherein the pre-encoded data items are stored in a media file in form of pre-encoded Network Abstraction Layer (NAL) units and being compliant with the single-layer AVC high profile, the converting device comprising:
a generator configured to generate one or more dummy data items in form of one or more NAL units to define an SVC scalable baseline profile Base Layer (BL);
an adaptor configured to read the pre-encoded AVC NAL units from the media file and to mark the read pre-encoded data items of the media content as belonging to an SVC Enhancement Layer (EL) and to manipulate the AVC NAL units being pre-encoded by a predictive encoding type not supported by the SVC scalable baseline profile to be compliant with the SVC scalable baseline profile;
an input interface; and
an output interface;
a data storage coupled to the input interface of the converting device, the data storage storing the encoded data items; and
a bitstream maker coupled to the output interface of the converting device, the bitstream maker configured to generate at least one bitstream comprising the generated dummy data items and the marked encoded data items of the media content.

* * * * *

UNITED STATES PATENT AND TRADEMARK OFFICE
CERTIFICATE OF CORRECTION

| | | |
|---|---|---|
| PATENT NO. | : 9,036,705 B2 | Page 1 of 1 |
| APPLICATION NO. | : 13/255212 | |
| DATED | : May 19, 2015 | |
| INVENTOR(S) | : Rusert et al. | |

It is certified that error appears in the above-identified patent and that said Letters Patent is hereby corrected as shown below:

In the Specification

In Column 2, Line 62, delete "than" and insert -- then --, therefor.

In the Claims

In Column 14, Line 12, in Claim 13, delete "to that" and insert -- to --, therefor.

Signed and Sealed this
Twenty-sixth Day of April, 2016

Michelle K. Lee
*Director of the United States Patent and Trademark Office*